US010370160B2

(12) United States Patent
Broinowski

(10) Patent No.: US 10,370,160 B2
(45) Date of Patent: Aug. 6, 2019

(54) SAFETY NOZZLE AND SAFETY VALVE

(71) Applicant: Stefan Broinowski, Lausanne (CH)

(72) Inventor: Stefan Broinowski, Lausanne (CH)

(*) Notice: Subject to any disclaimer, the term of this patent is extended or adjusted under 35 U.S.C. 154(b) by 0 days.

(21) Appl. No.: 15/504,263

(22) PCT Filed: Aug. 20, 2015

(86) PCT No.: PCT/US2015/046176
§ 371 (c)(1),
(2) Date: Feb. 15, 2017

(87) PCT Pub. No.: WO2016/029063
PCT Pub. Date: Feb. 25, 2016

(65) Prior Publication Data
US 2017/0233152 A1  Aug. 17, 2017

Related U.S. Application Data

(60) Provisional application No. 62/039,676, filed on Aug. 20, 2014.

(51) Int. Cl.
B65D 47/24 (2006.01)
F16K 17/04 (2006.01)
(Continued)

(52) U.S. Cl.
CPC .......... B65D 47/243 (2013.01); B65D 25/48 (2013.01); B65D 25/50 (2013.01); B67D 7/005 (2013.01); F16K 3/26 (2013.01); F16K 17/0486 (2013.01)

(58) Field of Classification Search
CPC ...... B65D 47/243; B65D 25/48; B65D 25/50; B67D 7/005; F16K 3/26; F16K 17/0486
See application file for complete search history.

(56) References Cited

U.S. PATENT DOCUMENTS 4,069,946 A  1/1978  Flider
5,603,364 A * 2/1997 Kerssies .................. B67D 7/48
141/206

(Continued)

FOREIGN PATENT DOCUMENTS

CN  101291869 A  10/2008
CN  202032113 U  11/2011

OTHER PUBLICATIONS

International Search Report dated Dec. 31, 2015.

Primary Examiner — Frederick C Nicolas
(74) Attorney, Agent, or Firm — Tarter Krinsky & Drogin LLP

(57) ABSTRACT

Exemplary embodiments of a safety nozzle and safety valve for portable gasoline containers are provided. A safety nozzle for a container can be provided, including a proximal end configured for placement in a safety valve, a distal end having a spout, a housing having an elongated portion extending from the proximal end to the distal end, a sliding bezel extending from an exterior of the housing to a sliding piston in an interior of the housing, a piston head having a first end at the proximal end and a second end for abutment with the sliding piston in the interior of the housing, and a retaining spring configured to maintain a holding pressure on the sliding piston to maintain the piston head in a closed position preventing liquid flow from the proximal end into the housing.

16 Claims, 5 Drawing Sheets

(51) Int. Cl.
 *B65D 25/48* (2006.01)
 *F16K 3/26* (2006.01)
 *B65D 25/50* (2006.01)
 *B67D 7/00* (2010.01)

(56) References Cited

U.S. PATENT DOCUMENTS

| | | | | |
|---|---|---|---|---|
| 6,155,464 A | * | 12/2000 | Vachon | B67D 7/005 |
| | | | | 141/291 |
| 6,230,944 B1 | * | 5/2001 | Castellano | B65D 47/243 |
| | | | | 222/481.5 |
| 6,968,875 B2 | * | 11/2005 | Nielsen | B67D 7/005 |
| | | | | 141/301 |
| 7,089,975 B2 | * | 8/2006 | Chrisco | B67D 7/005 |
| | | | | 141/285 |
| 7,621,304 B2 | | 11/2009 | Nielsen | |
| 8,403,185 B2 | * | 3/2013 | Vachon | B65D 47/06 |
| | | | | 141/309 |
| 2008/0035240 A1 | | 2/2008 | Nielsen | |
| 2010/0308085 A1 | | 12/2010 | Vachon | |
| 2014/0021222 A1 | | 1/2014 | Forbis | |
| 2014/0097210 A1 | | 4/2014 | Wright | |

\* cited by examiner

SAFETY NOZZLE AND SAFETY VALVE

CROSS-REFERENCE TO RELATED APPLICATIONS

This application relates to and claims priority from U.S. Provisional Patent Application Ser. No. 62/039,676 filed Aug. 20, 2014, the entire disclosure of which is hereby incorporated herein by reference.

FIELD OF THE DISCLOSURE

The present disclosure relates to exemplary embodiments of a safety nozzle and safety valve, and more particularly, to exemplary embodiments of a safety nozzle and safety valve for portable gasoline containers.

BACKGROUND INFORMATION

Gasoline or other combustible fluids can generally be stored in containers with a screw cap including a spout or a funnel for pouring the gasoline. This method can result in spills and can be dangerous when storing combustible fluids such as gasoline. Regulations are generally provided concerning the design of containers for storage and the use of gasoline. If these containers holding the flammable liquids allow spillage, it could result in a serious fire or explosion that could be dangerous for nearby persons and property.

SUMMARY OF EXEMPLARY EMBODIMENTS OF THE DISCLOSURE

At least some of the above described problems can be addressed by exemplary embodiments of the methods and systems according to the present disclosure. Exemplary embodiments of an apparatus are provided for a safety nozzle and safety valve for portable gasoline containers.

In some exemplary embodiments, a safety nozzle for a container can be provided, comprising a proximal end configured for placement in a safety valve, a distal end having a spout, a housing having an elongated portion extending from the proximal end to the distal end, a sliding bezel extending from an exterior of the housing to a sliding piston in an interior of the housing, a piston head having a first end at the proximal end and a second end for abutment with the sliding piston in the interior of the housing, and a retaining spring configured to maintain a holding pressure on the sliding piston to maintain the piston head in a closed position preventing liquid flow from the proximal end into the housing.

In some exemplary embodiments, the elongated portion can comprise a first tubular elongated portion extending from the proximal end, a middle tubular portion extending from the first elongated portion, and a second tubular elongated portion extending from the middle portion to the spout, wherein the middle portion is angled such that the second elongated portion is at an angle to the first elongated portion. The second elongated portion can have a smaller diameter than the first elongated portion. The first tubular elongated portion, the middle tubular portion and the second tubular elongated portion can be substantially hollow allowing a flow of a liquid. The first tubular elongated portion, the middle tubular portion and the second tubular elongated portion can be tapered.

In some exemplary embodiments, the safety nozzle can further comprise a breather tube extending from the distal end through a hollow support stem in the sliding piston to the proximal end configured to allow air to flow from the distal end through the breather tube. The safety nozzle can further comprise a support flange at the proximal end for abutment with the safety valve. In some exemplary embodiments, when the sliding bezel is slid toward the distal end the sliding piston moves towards the distal end, decreasing the holding pressure of the retaining spring and causing the piston head to move to an open position, allowing liquid to flow from the proximal end past the piston head and sliding piston into the elongated portion towards the spout.

In some exemplary embodiments, the safety nozzle can further comprise a support flange at the proximal end for abutment with a top wall of the safety valve. The safety nozzle can be configured to be inserted into a cap of a container holding the liquid.

In some exemplary embodiments, a safety valve can be provided, comprising a top portion having a cylindrical wall, a top cylindrical edge and a hollow interior, a bottom portion having a cylindrical wall, a bottom wall, a top cylindrical edge and a hollow interior, a tensioning mechanism within the interior of the cylindrical wall of the bottom portion configured to hold the top cylindrical edge of the top portion a predetermined distance from the top cylindrical edge of the bottom portion, and a valve within the bottom wall of the bottom portion tensioned in a closed position restricting flow from the bottom portion to the top portion.

The safety valve can further comprise an inner wall having one or more holes that are within the cylindrical wall of the bottom portion when the valve is in the closed position. In some exemplary embodiments, when a force is applied on the top cylindrical edge of the top portion to move the top cylindrical edge the predetermined distance in a first direction such that the top cylindrical edge of the top portion is flush with the top cylindrical edge of the bottom portion, the inner wall extends the predetermined distance in the first direction such that the one or more holes move past the bottom wall of the bottom portion, exposing the one or more holes to a liquid within a container to allow the liquid to flow through the safety valve in an open position.

The safety valve can be configured for placement into an opening of the container. In some exemplary embodiments, a cap of a container can apply pressure while being threaded in a first rotational direction to the top cylindrical edge of the top portion to move the top cylindrical edge the predetermined distance such that the top cylindrical edge of the top portion is flush with the top cylindrical edge of the bottom portion, allowing the safety valve to be in the open position. In some exemplary embodiments, when the cap of the container is threaded in a second rotational direction the safety valve is in the closed position.

In some exemplary embodiments, the hollow interior of the top portion can be configured to receive a nozzle. A support flange of the nozzle can abut the top cylindrical edge of the top portion.

BRIEF DESCRIPTION OF THE DRAWINGS

The foregoing and other objects of the present disclosure will be apparent upon consideration of the following detailed description, taken in conjunction with the accompanying exemplary drawings and claims, in which like reference characters refer to like parts throughout, and in which:

Figure 1:
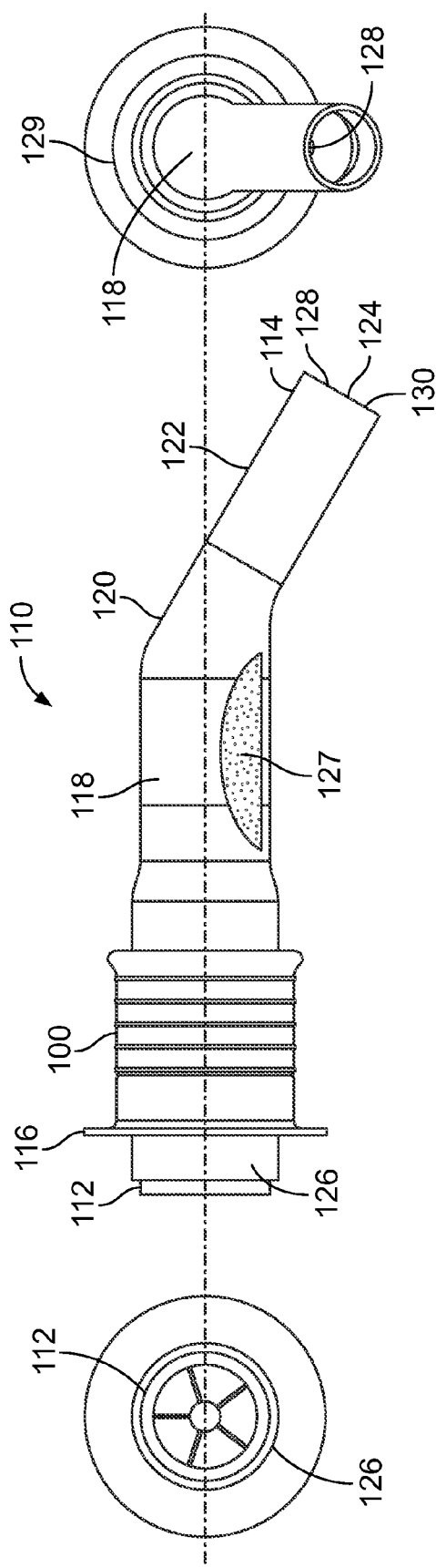
FIG. 1(a) is an illustration of a safety nozzle according to an exemplary embodiment of the present disclosure.
FIG. 1(b) is an illustration of a bottom view of the safety nozzle of FIG. 1(a) according to an exemplary embodiment of the present disclosure.
FIG. 1(c) is an illustration of a top view of the safety nozzle of FIG. 1(a) according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

Exemplary embodiments of the safety nozzle and safety valve will now be described with reference to the figures. The following description of the various embodiments is merely exemplary in nature and is in no way intended to limit the scope of the disclosure, its application, or uses.

Figure 3A:
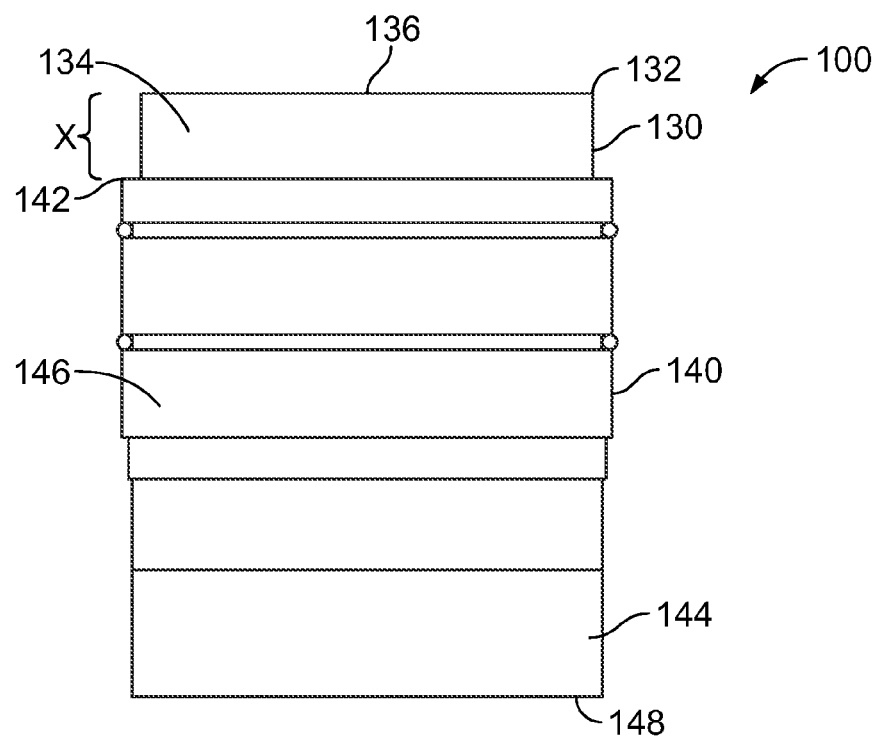
FIG. 3(a) is an illustration of a safety valve in a closed position according to an exemplary embodiment of the present disclosure.

FIG. 1(a) is an illustration of a safety nozzle 110 according to an exemplary embodiment of the present disclosure. FIG. 1(b) is an illustration of a bottom view of the safety nozzle 110 and FIG. 1(c) is an illustration of a top view of the safety nozzle 110. The nozzle 110 can have a proximal end 112 and a distal end 114. The distal end 114 can have a spout 124 through which gasoline or other fuels or liquids can pour from. The proximal end 112 can have an O-ring or ring seal or similar structure on the support flange 116, which can sit on a top cylindrical edge 132 of the safety valve 100 as shown in FIG. 3(a), as will be further explained below.

The safety nozzle 110 can have a safety valve 100, which can have a substantially uniform thickness and cross-section. A first elongated portion 118 can have a uniform thickness and cross-section, or can slightly narrow from a first end towards the distal end 114. The nozzle 110 can have a second elongated portion 122 containing the spout 124, and can also have a uniform thickness and cross-section from the proximal end 112 towards the distal end 114, or can slightly narrow from a first end to a second end at the spout 124. The nozzle 110 can have a middle portion 120 joining the first elongated portion 118 and second elongated portion 122, and can be tapered from the first elongated portion 118 and second elongated portion 122, and be angled such that the second elongated portion 122 is angled compared to the first elongated portion 118, as shown in FIG. 1. The second elongated portion 122 can have a smaller diameter than the first elongated portion 118. The first elongated portion 118, middle portion 120 and second elongated portion 122 can have a hollow tubular interior, allowing flow of gasoline or other fuel/liquid. The safety valve 100 can be positioned on a length of the nozzle 110 allowing the control of gasoline or other fuels or liquid to flow through the nozzle 110 or not while preventing spillage when at rest in a closed position. The safety valve 100, which can be a sliding flow control valve, can be positioned on the first elongated portion 118 allowing control of gasoline or other fuels or liquid to flow through the safety nozzle 110 while preventing spillage when at rest in a closed position, as will be described below.

Figure 2:
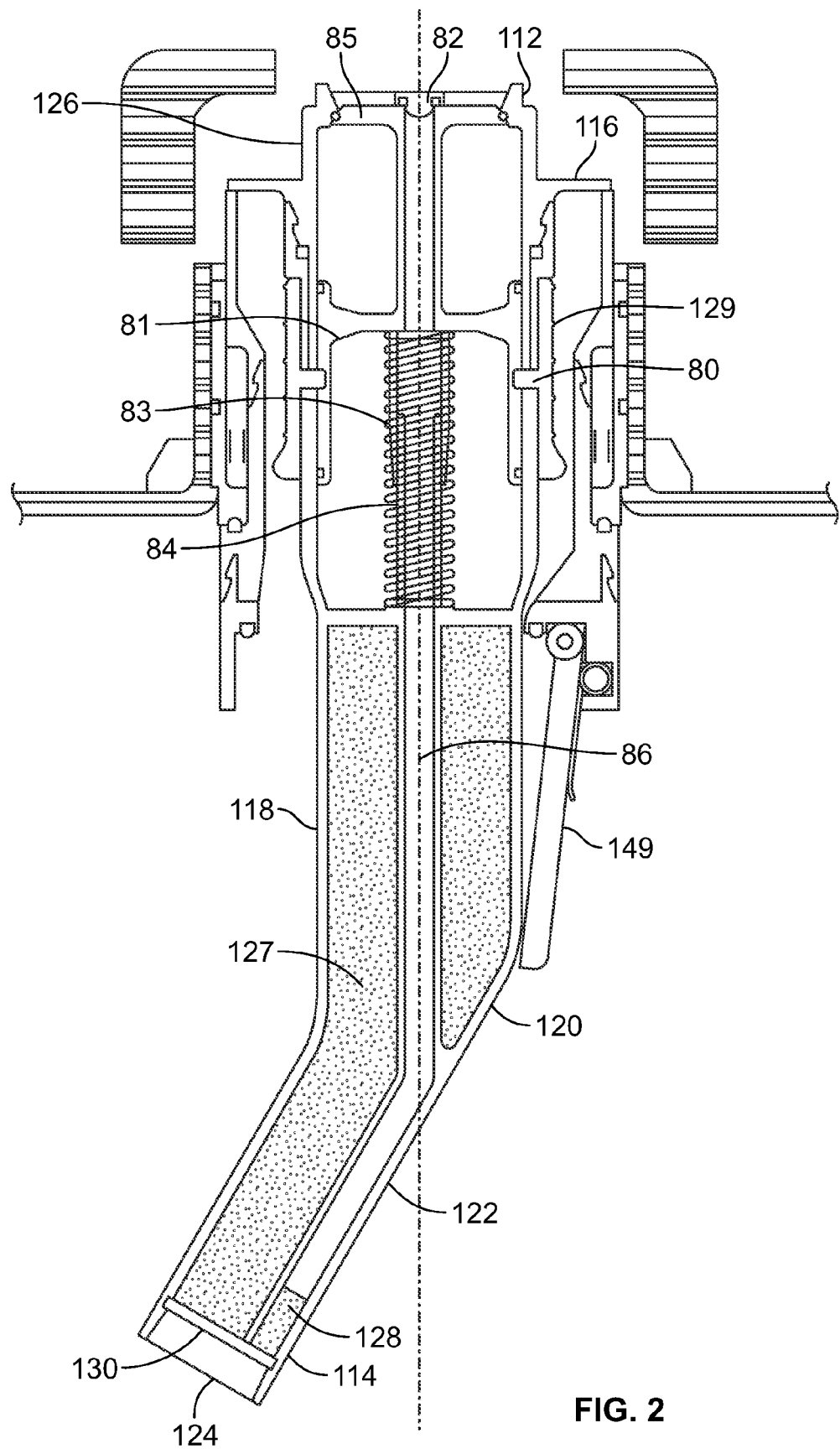
FIG. 2 is a cross-section view of the safety nozzle according to an exemplary embodiment of the present disclosure.

FIG. 2 is a cross-section view of the container safety nozzle 110 according to an exemplary embodiment of the present disclosure. The internal sections of the safety nozzle 110 and the entrance 128 of the air breather tube 86 can be filled with a heat sink material 127 and retained in place by, e.g., a filter 130. The heat sink material 127 can have a mass and volumetric proportion within the nozzle 110 and the entrance 128 of the air breather tube 86 rated by application, volumetric percentage and material type to accommodate the explosive heat wave characteristic of a liquid that can be stored in a container but not to restrict flow of the liquid from the container by approximately 1.5% by volume. The heat sink material 127 can mitigate consequences of the nozzle distal end 124 and the entrance 128 of the air breather tube 86 being exposed to fire, sparks, or other heat sources that could ignite the contents of the container.

The sliding flow control valve 129 of the safety nozzle 110 can have a sliding bezel 80 which slides along the elongated portion 118 of the safety nozzle 110 and is connected via a slot through the housing of the elongated portion 118 to a sliding piston 81 held in position by the housing of the elongated portion 118 and a hollow support stem 84 with a retaining spring 83. The retaining spring 83 can maintain a holding pressure on the sliding piston 81 keeping the piston head 85, which is connected to the supporting sliding piston 81, in a closed position against the piston seat 82, sealing the entrance to the safety nozzle 110, thereby stopping liquid from entering the safety nozzle 110. To permit flow from a container through a safety valve 100 when the safety nozzle 110 is attached, the sliding bezel 80 is slid down the elongated portion 118 toward the distal end 124 of the safety nozzle 110, in turn moving the sliding piston 81, permitting liquid to flow from a container through a safety valve 100 (described below) past the opened piston head 85, through the piston 81, down the middle portion 120 and second elongated portion 122, and out the distal end 124 to the receptor of the liquid. Conversely, air is allowed up the hollow stem 84 or breather tube 86 through the hollow support stem 84, past the open breather tube vent plug 82 into the safety valve equaling the pressure in the container and permitting a smooth flow of liquid into the receptor.

FIG. 3(a) is an illustration of a safety valve 100 in a closed position according to an exemplary embodiment of the present disclosure. The safety valve 100 has a top portion 130 and bottom portion 140. The top portion 130 has a cylindrical wall 134 and a cylindrical edge 132. The top portion 130 has a hollow interior 136. The bottom portion 140 has a top edge 142 and a cylindrical wall 146, and a hollow interior. The wall 146 has a tensioning mechanism, such as a tension spring, within the diameter of the wall 146 that holds the cylindrical edge 132 a distance x from the top edge 142. The bottom portion 140 has a bottom edge 144 that has a wall 148, which restricts the flow of gasoline from a container, as will be described below. The bottom wall 148 can encompass a butterfly valve or wafer check valve (e.g., a flap) (not shown) tensioned in the closed position which restricts flow of gasoline or similar liquid from a container. The proximal end 112 of the safety nozzle 110 is placed inside the safety valve 100 such that portion 126 fits within the hollow interior 136 of the top portion 130, and O-ring or ring seal or similar support flange 116 sits on top of cylindrical edge 132.

Figure 3B:
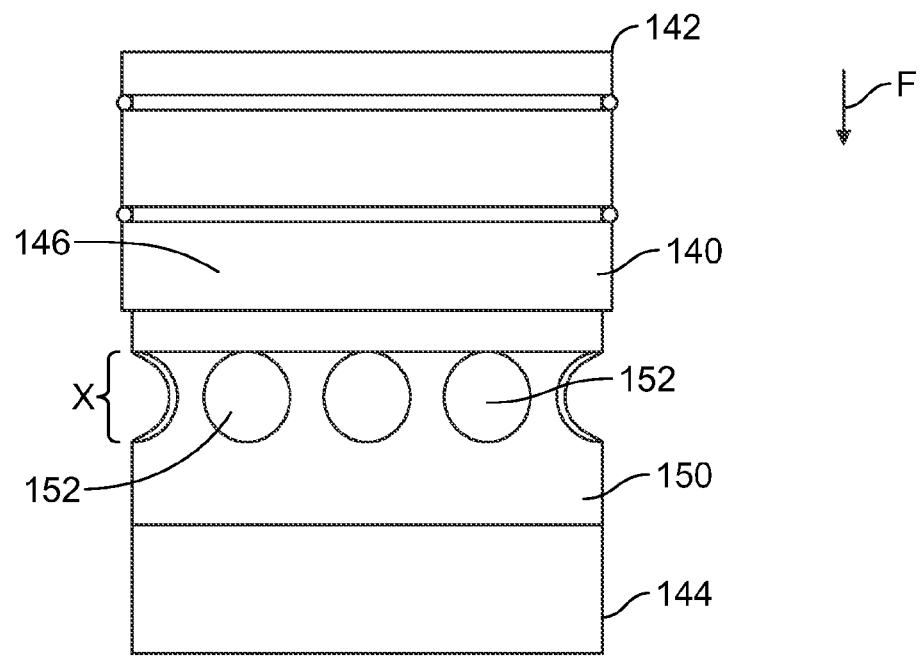
FIG. 3(b) is an illustration of the safety valve in an open position according to an exemplary embodiment of the present disclosure.

FIG. 3(b) is an illustration of a safety valve 100 in an open position according to an exemplary embodiment of the present disclosure. When a downwards force F is applied on the cylindrical edge 132 (such as by O-ring support flange 116 of the safety nozzle 110), the cylindrical edge 132 withdraws within the top edge 142 by a distance x, causing bottom edge 144 to extend out of the bottom portion 140 by a corresponding distance x. The inner wall 150 of the bottom edge 144 can have one or more holes 152 that can allow the flow of gasoline or other fuel/liquid to flow through the safety valve 100 into the safety nozzle 110 from a container, as will be described below.

Figure 4:
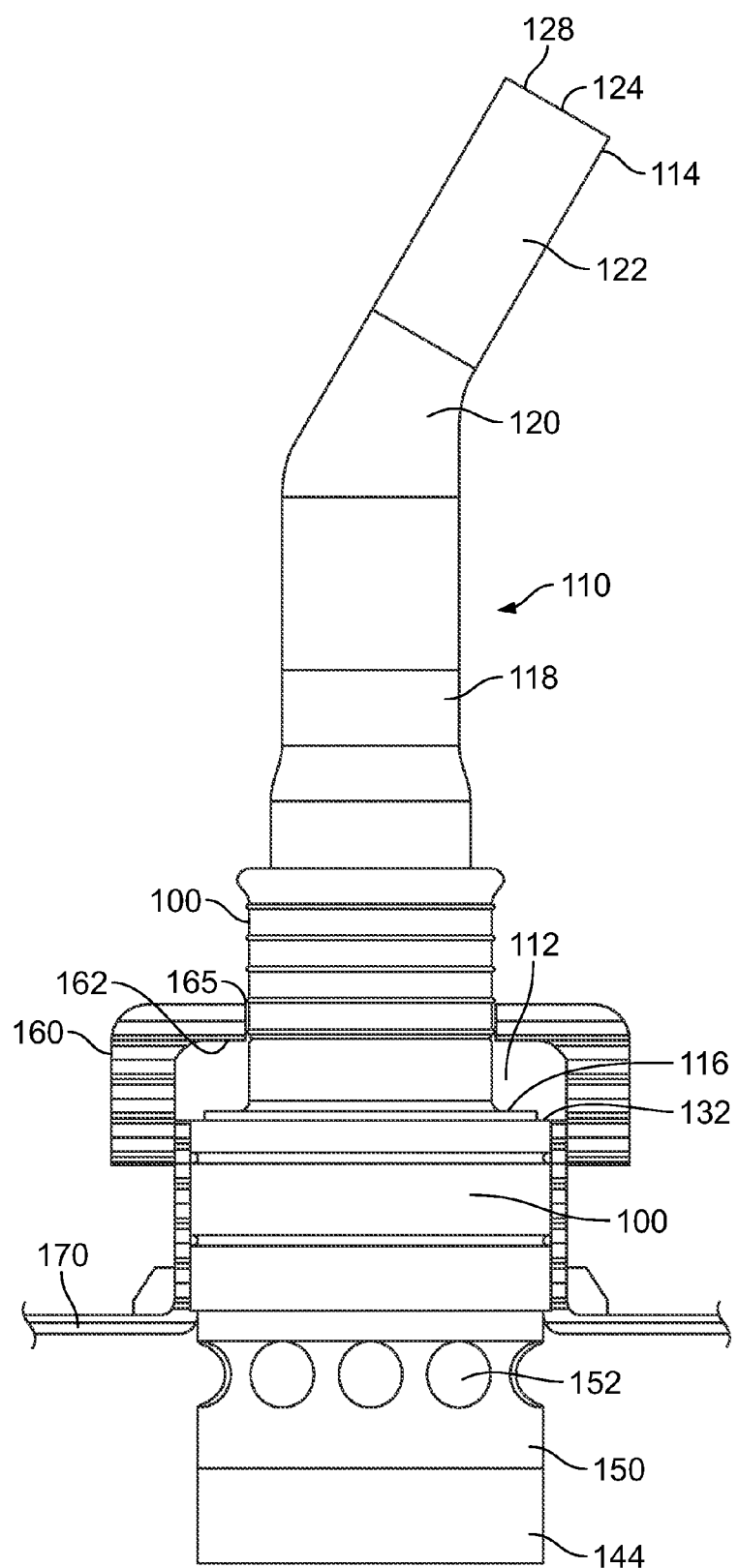
FIG. 4 is an illustration of a safety valve in an open position and a safety nozzle inserted into a container according to an exemplary embodiment of the present disclosure.

FIG. 4 is an illustration of the safety valve 100 in an open position and a safety nozzle 110 inserted into a container 170 according to an exemplary embodiment of the present disclosure. In use, the safety valve 110 can be inserted into an opening in the container 170 as shown in FIG. 4. The safety nozzle 110 can be placed within the safety valve 100, by inserting portion 126 into the hollow interior 136. A cap 160 having a middle opening 165 can be placed over the distal end 114 of the safety nozzle 110 and brought over to the proximal end 112 of the safety nozzle 110. The container 170 can have threads that connect with an interior of the cap 160 such that the cap 160 can be screwed over the safety valve 100. A lower wall 162 of the cap 160 can contact and apply pressure to the O-ring support flange 116 as it is screwed such that bottom edge 144 extends downward, allowing the liquid to flow through the one or more holes 152 of the inner wall 150.

Once the gasoline or other fuel/liquid has been poured using safety nozzle 110, a user can simply unscrew the cap 160. This will release the pressure on O-ring support flange 116, causing the tensioning mechanism in the wall 140 to retract bottom edge 144 such that the gasoline or other fuel or liquid cannot flow through holes 152, as the inner wall 150 has retracted and the bottom wall 148 of the bottom edge 144 does not allow any flow. The safety nozzle 110 can be left in this configuration inside the safety valve 100 and no flow of the gasoline will be permitted by the safety valve 100. The safety valve 100 can be left within the opening of the container 170.

In some exemplary embodiments, in a closed position, the safety nozzle 110 can be inserted into a container 170 for storage and to restrict flow from the container. The distal end 114 of the safety nozzle 110 can be placed within the safety valve 100 by inserting the distal end 114 of the safety nozzle 110 into the hollow interior 136. A cap 160 having a middle opening 165 can be placed over the distal end 112 of the safety nozzle 110 and brought over the safety nozzle 110 to the back of proximal O-ring support flange 116 of the safety nozzle 110. The container 170 can have threads that connect with an interior of the cap 160 such that the cap 160 can be screwed over the safety valve 100. The safety nozzle 110 will push through the butterfly flap or wafer check valve 149 (as shown in FIG. 2) which will open, allowing the distal end 114 of the safety nozzle 110 to enter the container space. A lower wall 162 of the cap 160 can contact and apply pressure to the back of O-ring or ring seal or similar structure on the support flange 116 as it is screwed such that bottom edge 144 extends downward. The cap 160 closes the container 170 so that gasoline or similar liquid flow would not be permitted by the complete assembly, including safety valve 100, spout 124, cap 160 and container 170, in this configuration to exit the container.

Figure 5C:
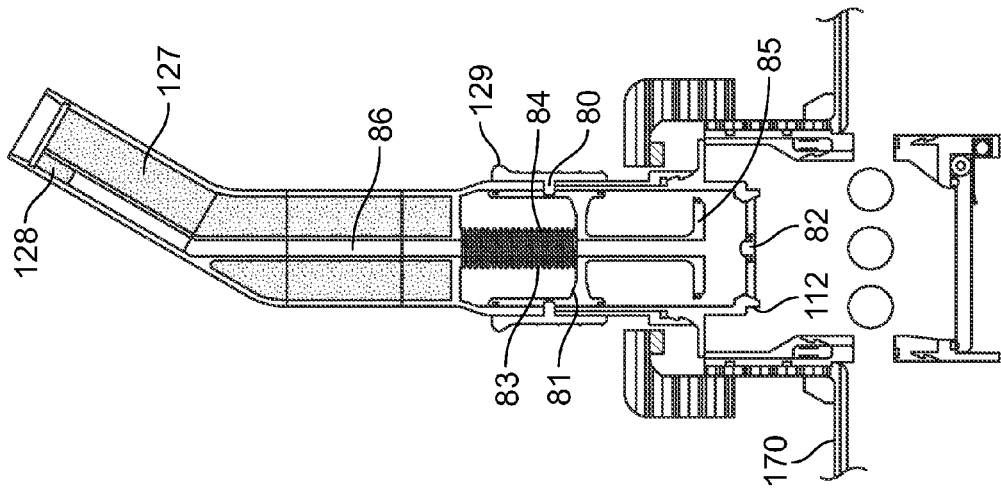
FIG. 5(c) is an illustration of a cross-section view of a safety nozzle in an open position in place on a safety valve in an open position on a container according to an exemplary embodiment of the present disclosure.
Figure 5B:
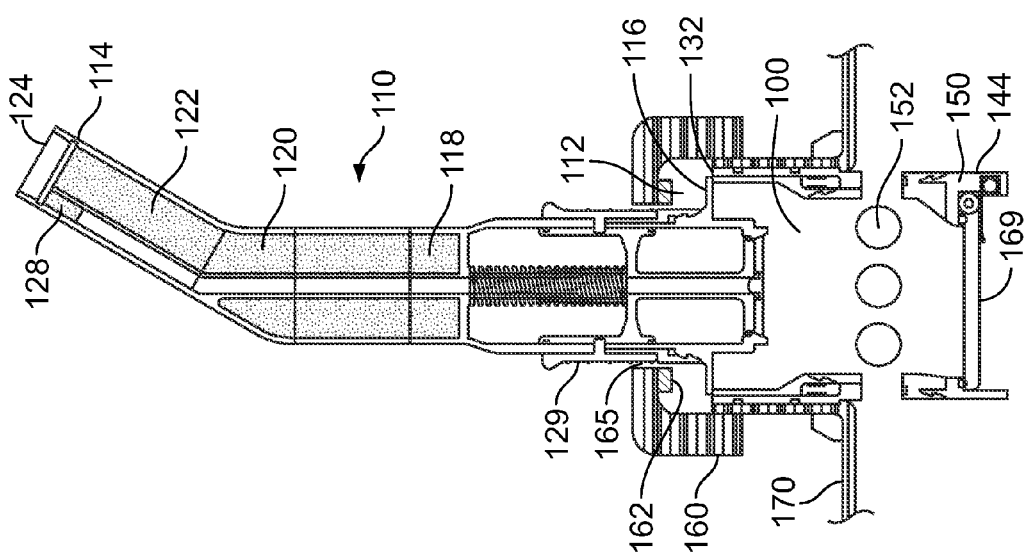
FIG. 5(b) is an illustration of a cross-section view of a safety nozzle in a closed position in place on a safety valve in an open position on a container according to an exemplary embodiment of the present disclosure.
Figure 5A:
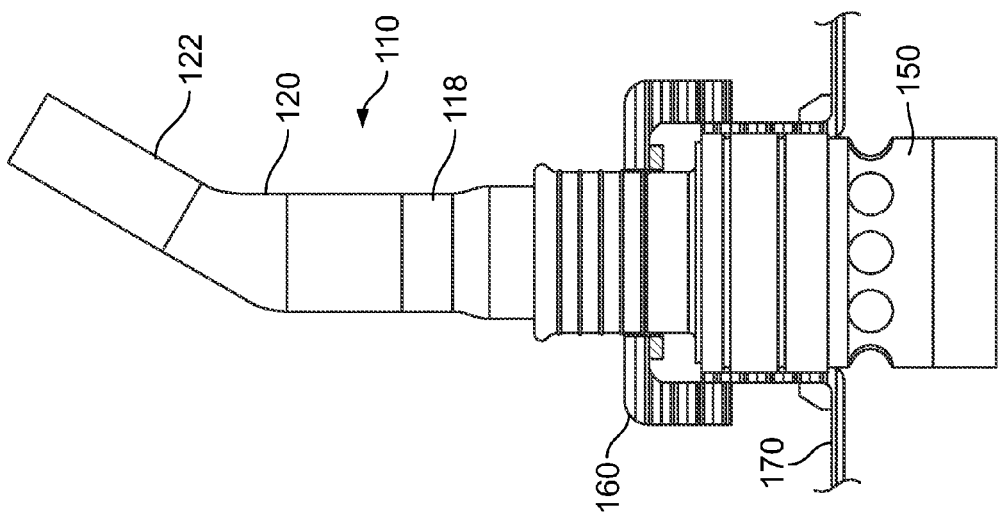
FIG. 5(a) is an illustration of a safety nozzle in place on a safety valve in an open position on a container according to an exemplary embodiment of the present disclosure.

FIG. 5(a) is an illustration of a safety nozzle in place on a safety valve in an open position on a container according to an exemplary embodiment of the present disclosure. FIG. 5(b) is an illustration of a cross-section view of a safety nozzle in a closed position in place on a safety valve in an open position on a container according to an exemplary embodiment of the present disclosure. When the safety nozzle 110 is in a closed position, the sliding flow control valve 129 of the safety nozzle 110 can have a sliding bezel 80 which slides along the elongated portion 118 of the safety nozzle 110, and is connected via a slot through the housing of the elongated portion 118 to a sliding piston 81 held in position by the housing of the elongated portion 118 and a hollow support stem 84 with a retaining spring 83. The retaining spring 83 can maintain a holding pressure on the sliding piston 81, keeping the piston head 85, which is connected to the supporting sliding piston 81, in a closed position against the piston seat 82, sealing the entrance to the safety nozzle 110, thereby stopping a liquid from entering the safety nozzle 110.

FIG. 5(c) is an illustration of a cross-section view of a safety nozzle in an open position in place on a safety valve in an open position on a container according to an exemplary embodiment of the present disclosure. When the safety nozzle 110 is in an open position, the sliding flow control valve 129 of the safety nozzle 110 is slid down the elongated portion 118 toward the distal end 124 of the safety nozzle 110, in turn moving the sliding piston 81 against the resisting retaining spring 83, permitting liquid to flow from a container 170 through a safety valve 100 past the opened piston head 85, through the piston 81, down the middle portion 120 and second elongated portion 122, and out the distal end 124 to the receptor of the liquid. Conversely, air is allowed up the hollow stem 84 or breather tube 86 through the hollow support stem 84, past the open breather tube vent plug 82 into the safety valve 100 equaling the pressure in the container and permitting a smooth flow of liquid from the safety nozzle 110 into the receptor.

Various other considerations can also be addressed in the exemplary applications described according to the exemplary embodiments of the present disclosure. For example, various materials may be used to construct the elements described in the figures, such as plastic or other materials. Various sizes and dimensions of the elements can be provided, as well as shapes for the container, safety nozzle and safety valve. The safety valve and/or safety nozzle of the present disclosure can be used for various sizes and types of containers of any liquid which can require proper sealing and safety requirements. In some exemplary embodiments, a dust cap can be provided for attachment to the distal portion of the nozzle covering the spout.

The exemplary embodiments of the present disclosure can allow for several advantages. The safety valve and/or safety nozzle of the present disclosure allow for proper safety measures for gasoline containers that can be fire hazards in situations where there is a loose cap or no cap, and fuel spills may occur. The safety valve and/or safety nozzle of the present disclosure allow for no access to the gasoline unless the safety valve is open, which cannot be opened without the cap of the container and the safety nozzle in some exemplary embodiments. The safety valve and/or safety nozzle of the present disclosure allow for flow only through the protrusions of the safety valve once the safety valve is opened and the spring loaded safety nozzle valve is held open in the open position using a cap for the container in some exemplary embodiments.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure. The disclosures of all systems, documents and publications cited herein are hereby incorporated herein by reference in their entireties.

What is claimed is:

1. A safety nozzle comprising:
   a housing including a proximal end and a distal end, the proximal end including a piston seat and the distal end including a first portion of a breather tube;
   a sliding bezel, the sliding bezel capable of sliding along an exterior portion of the housing from a first position to a second position;
   a sliding piston, the sliding piston capable of sliding along an interior portion of the housing, the sliding piston being connected to the sliding bezel via a slot through the housing, the sliding piston including a piston head and a hollow support stem,
   wherein the first portion of the breather tube extends from the distal end of the housing to the hollow support stem and a second portion of the breather tube continues through the hollow support stem, the first portion of the breather tube and the second portion of the breather tube configured to allow air to flow from the distal end of the housing to the proximal end of the housing.

2. The safety nozzle of claim 1 wherein, in the first position, an end of the hollow support stem is plugged with a vent plug located on the piston seat.

3. The safety nozzle of claim 2 wherein, in the second position, the end of the hollow support stem is unplugged from the vent plug.

4. The safety nozzle of claim 1 wherein, in the first position, the piston head is seated against the piston seat.

5. The safety nozzle of claim 4 wherein, in the second position, the piston head is unseated from the piston seat.

6. The safety nozzle of claim 1 further comprising:
   a spout.

7. The safety nozzle of claim 6 wherein the air flowing from the distal end of the housing to the proximal end of the housing equalizes pressure within a container and permits a smooth flow of a liquid from the container to the spout.

8. The safety nozzle of claim 1 further comprising:
   a retaining spring.

9. The safety nozzle of claim 8 wherein the retaining spring maintains a holding pressure on the sliding piston keeping the piston head in a closed position against the piston seat thereby sealing an entrance of the housing and stopping a liquid from a container from entering the housing.

10. The safety nozzle of claim 1 wherein the housing further includes:
    a first tubular elongated portion extending from the proximal end;
    a middle tubular portion extending from the first elongated portion; and
    a second tubular elongated portion extending from the middle portion to a spout.

11. The safety nozzle of claim 10 wherein the middle portion is angled such that the second elongated portion is at an angle to the first elongated portion.

12. The safety nozzle of claim 11 wherein the second elongated portion has a smaller diameter than the first elongated portion.

13. The safety nozzle of claim 12 wherein the first tubular elongated portion, the middle tubular portion and the second tubular elongated portion are substantially hollow allowing a flow of a liquid.

14. The safety nozzle of claim 13 wherein the first tubular elongated portion, the middle tubular portion and the second tubular elongated portion are tapered.

15. The safety nozzle of claim 1 wherein the proximal end of the housing is configured for placement in a safety valve.

16. The safety nozzle of claim 15 further comprising: a support flange at the proximal end for abutment with the safety valve.

* * * * *